(12) United States Patent
Schulzki

(10) Patent No.: US 8,664,545 B2
(45) Date of Patent: Mar. 4, 2014

(54) SCALE TRANSPORT DEVICE HAVING LATERAL SUPPORT ELEMENTS WITH BELT DRIVES

(75) Inventor: Alexander Schulzki, Stelzenberg (DE)

(73) Assignee: Wipotec Wiege- und Positioniersysteme GmbH, Kaiserslautern (DE)

( * ) Notice: Subject to any disclaimer, the term of this patent is extended or adjusted under 35 U.S.C. 154(b) by 654 days.

(21) Appl. No.: 12/854,695

(22) Filed: Aug. 11, 2010

(65) Prior Publication Data

US 2011/0036647 A1 Feb. 17, 2011

(30) Foreign Application Priority Data

Aug. 14, 2009 (EP) .................. 20 2009 010 875

(51) Int. Cl.
*G01G 13/00* (2006.01)
*B65G 15/10* (2006.01)
(52) U.S. Cl.
USPC ........................................ 177/25.15; 177/245
(58) Field of Classification Search
USPC .................... 177/25.15, 145, 210 EM, 5
See application file for complete search history.

(56) References Cited

U.S. PATENT DOCUMENTS

| | | | |
|---|---|---|---|
| 3,203,534 A | | 8/1965 | Burkhardt et al. |
| 4,566,584 A | * | 1/1986 | Lindstrom .................... 177/145 |
| 5,086,855 A | * | 2/1992 | Tolson ............................ 177/5 |
| 5,088,569 A | * | 2/1992 | Checcucci .................... 177/145 |
| 5,367,128 A | * | 11/1994 | Tsukasa et al. ............... 177/212 |
| 5,434,366 A | * | 7/1995 | Troisi .............................. 177/52 |
| 6,107,579 A | * | 8/2000 | Kinnemann .................. 177/145 |
| 6,265,675 B1 | | 7/2001 | Hübler et al. |
| 6,947,912 B1 | * | 9/2005 | Huebler et al. ............... 705/414 |
| 7,271,352 B2 | * | 9/2007 | Rabindran .................. 177/25.15 |
| 7,408,124 B2 | | 8/2008 | Fochler |
| 7,858,889 B2 | * | 12/2010 | Hahn et al. .................... 177/145 |
| 2006/0237238 A1 | | 10/2006 | Fochler |
| 2006/0249438 A1 | | 11/2006 | Schwarzbauer et al. |
| 2008/0078708 A1 | | 4/2008 | Schererz et al. |

FOREIGN PATENT DOCUMENTS

| | | |
|---|---|---|
| EP | 1 400 790 A1 | 3/2004 |
| JP | 47-14170 U | 10/1972 |
| JP | 6-219528 A | 8/1994 |
| JP | 6-69757 U | 9/1994 |
| JP | 2002-263583 A | 9/2002 |

OTHER PUBLICATIONS

JPO, Notification of Reasons for Denial dated Apr. 19, 2012 in corresponding Japanese Patent Application No. 2010-179640 (4 pages).

* cited by examiner

*Primary Examiner* — Randy W Gibson
(74) *Attorney, Agent, or Firm* — The Culbertson Group, PC

(57) ABSTRACT

Transport device for a scale, in particular a dynamic scale that preferably operates with electromagnetic force compensation, with a weighing belt that forms a preload for a weighing cell. The weighing belt is constructed to transport materials to be weighed along the X-direction while weighing. The weighing belt receives the materials from a supply device arranged in an upstream inlet area, including a supply belt or supply rollers for supporting the materials and not forming a preload for the weighing cell. Two weighing-guide elements extending in the X-direction and forming a preload provide lateral support of the materials in the Y-direction to weigh the materials during the transport on the weighing belt in the leaning position. The minimum Y-distance between the weighing-guide elements is greater than the maximum extent of the materials in the Y-direction.

19 Claims, 3 Drawing Sheets

Fig. 2

SCALE TRANSPORT DEVICE HAVING LATERAL SUPPORT ELEMENTS WITH BELT DRIVES

FIELD OF THE INVENTION

The present invention relates to a transport device for a scale.

BACKGROUND

Transport devices for dynamic scales are known from prior art. In such systems, the materials to be weighed are supplied in succession to a weighing belt and weighed via this belt during transport. The materials, in particular letters, are supplied to the weighing belt via an inlet area and transferred downstream of the weighing belt to a removal unit.

In the transfer of the letter in the inlet area from the supply device, which is not being weighed, to the weighing belt, which constitutes the preload, an undesired force shunting often occurs and leads to dynamic effects that interfere with the weighing signal. For a particularly precise and interference-free determination of the weight of the letter, clamping the letter laterally on the weighing belt during the weighing process is known from prior art. Such a method reduces or eliminates shocks so that a steady transfer of the letter becomes possible. Such a solution is shown, for example in DE 10 2007 044 746 A1.

Also known is the idea of transporting the letters already in the inlet area at the speed with which they are conveyed further on the weighing belt, in order to largely preclude shock effects or mass moment of inertia effects. To this end, DE 10 2005 018 395 A1 teaches clamping the materials on edge laterally between opposing conveyor belts and releasing the clamping in the area above a horizontal weighing belt, so that the materials fall onto the weighing belt and are weighed there. They are simultaneously further transported with the weighing belt and finally again clamped by the conveyor belts downstream of the scale. In this case, however, the weighing cell is influenced by considerable interfering forces. In addition, this device is not suitable for transporting letters on edge on the weighing belt.

Therefore the solutions known from prior art cannot satisfy higher requirements for weighing precision with a transport speed that is simultaneously as high as possible.

SUMMARY OF THE INVENTION

Provided herein is a dynamic scale with improved transport devices over those known in the prior art. In particular, the transport devices herein reduce undesired dynamic forces in the transfer of the materials to be weighed onto the weighing belt.

The invention provides that a particularly low-interference transfer from the inlet area to the weighing belt is possible if the materials are protected by lateral guide elements against falling during the transport on the weighing belt, and are guided making lateral contact, but the minimum distance between these guide elements is always larger than the maximum thickness of the materials when they are conveyed between the guide elements. Since the letter is not clamped during the weighing, there are no shock loads in the direction of conveyance or transverse thereto.

Preferably, the guide elements spaced away from one another serve only for lateral guidance and stabilization of the letter, which is, in particular, transported on edge. The guide elements preferably serve only as a support for lateral contact of the letter, without actively applying additional forces to it.

For a particularly interference-free weighing of a letter, the letter expediently runs across the weighing belt without changing its orientation in space and also without being subjected to any temporarily applied lateral pressure forces in any way. Since the letter rests on the weighing belt only at its lower edge and lies freely against a guide element at one side (and is otherwise not subjected to any additional forces), the dynamic shock effects known from prior art are advantageously reduced. For a particularly precise weighing result, the guide elements above the weighing belt, together with it, form a preload for the scale, so that force shunting effects during the transport across the weighing belt are precluded.

The transport device according to one embodiment of the invention includes a weighing belt that forms a preload for a weighing cell. This is shown in the block diagram of FIG. 3, with the weighing belt preload 302 shown atop the electromagnetic weighing cell 303. The weighing belt is constructed to transport materials to be weighed standing on edge, wherein this transport is to take place in a first direction X. In this embodiment, the weighing belt obtains the materials from a supply device arranged in an upstream inlet area. The weighing belt includes means for transporting the materials (a supply belt or supply rollers or similar means suitable for supporting and transporting the materials). The supply device with its transport means does not constitute a preload for the weighing cell. The weighing belt takes up the materials from the upstream supply device in order to weigh them and transfers them to a removal device arranged in a downstream outlet area. The materials to be weighed, preferably letters, expediently extend during the weighing process in the first direction X, which corresponds to the transport direction of the weighing belt, a horizontal direction Y running perpendicular thereto, and a direction Z running perpendicular to both directions X, Y, which also corresponds to the measurement direction of the weighing cell.

Two weighing-guide elements constituting a preload are provided in order to guide the materials laterally in the Y-direction during the transport on the weighing belt, without clamping them. Such weighing-guide elements are shown in the block diagram of FIG. 3, with the weighing guide element 301 being shown as a preload to the electromagnetic weighing cell 303. For this purpose, the minimum Y-distance between the weighing-guide elements is selected to be greater than the maximum extent of the materials in the Y-direction. The maximum thickness of the letters is thus always less than the minimum distance between the weighing-guide elements, so that undesired clamping effects are avoided.

Since letters generally have a thin format, they cannot stand freely on the weighing belt while they are transported on edge, but rather lean slightly against one or the other of the two guide elements. Therefore, they assume a stable position during the transport over the weighing belt, and can be reliably weighed.

One embodiment of the invention provides that the supply device upstream of the weighing belt also has at least two inlet guide elements in order to already stabilize or guide the materials in this area. Here too, the Y-distance between the inlet guide elements is to be larger than the maximum Y-dimension or thickness of the letters. This is to apply at least in a transfer area at which the letters are transferred from the supply device to the weighing belt, wherein the upper side of the weighing belt serving for transport and the transport belt of the supply device are oriented flush with one another. Due to the fact that the Y-distances between the inlet guide elements and the weighing-guide elements are selected to be equal in this area, as well as due to their mutually flush arrangement, the letter is gently received by the weighing belt without undesired shock effects and without changing its orientation in space or experiencing additional forces in the transition. The weighing result can be advantageously improved in comparison to the prior art by such a largely interference-free transfer, since the weighing cell is not influenced by shocks and the settled weighing result can be provided more quickly.

To avoid undesired force shunting, the inlet guide elements are formed separated from the weighing-guide elements. While the former can be stationary or connected to the supply device, the weighing-guide elements constitute a preload for the weighing cell.

To achieve a particularly gentle transfer of the materials from the inlet area onto the weighing belt, one embodiment of the invention provides that the inlet guide elements and the weighing-guide elements directly adjoin one another in the X-direction or partially overlap in the X-direction (such overlap is shown at the areas marked 201 in FIG. 2). In the latter case, the letter is continuously guided laterally without a transition or a step, with the weighing-guide elements completely taking over the lateral guidance no later than at the time of the weighing.

Another variation further provides that at least one of the weighing-guide elements is constructed as a belt element that can preferably be driven at the same speed as the weighing belt. Thereby transport forces act on the letter in the same manner both via the weighing belt and in the area of the lateral contact of the letter, and guarantee its stable further transport. Further, at least one of the inlet guide elements can also be constructed as a belt element, in order to be driven at the same speed as the at least one weighing-guide element and/or weighing belt. In contrast to rigid or immobile guide elements, relative movements between the letters and the lateral contact area or the frictional forces resulting therefrom are avoided in this way. All elements that can generate a movement component in the X-direction and are suitable for contact with the letter can serve as such driven guide elements. Even though belts appear particularly advantageous due to their longer extension in the X-direction, rollers can also be used, for example.

Undesired dynamic interference effects can be further reduced according to an additional embodiment of the invention by driving the weighing belt and the driven weighing-guide elements with a common motor, preferably by means of toothed belts. Such a common motor is shown in the block diagram of FIG. 3, where common motor 304 is provided to drive weighing guide elements 301 and weighing belt 302. In comparison to a separately provided motor for the guide elements, this not only reduces the mass constituting a preload, but also interference frequencies and imbalances, as well as costs.

The guide elements are expediently seated by means of shafts that run in the measurement direction of the weighing cell, i.e. in the Z-direction. Imbalance forces that may occur then act perpendicular to the measurement direction and reduce the interference influence on the weighing cell.

One embodiment of the invention further provides for the use of intelligent motors with high-resolution angle of rotation measurement systems for driving the belts and guide elements. With such a system, the rotational speed, the angle of rotation and the acceleration of the motor shafts and the components coupled to them can be specified and synchronized with high precision. In particular, the phase angles of imbalances of different driven components or motor shafts can be set relative to one another such that the imbalance forces output by them compensate one another to the best extent possible.

BRIEF DESCRIPTION OF THE DRAWINGS

FIG. 2 shows an embodiment of the invention in which the weighing guide elements are overlapped in the X-direction.

DETAILED DESCRIPTION OF PREFERRED EMBODIMENTS

Figure 1:
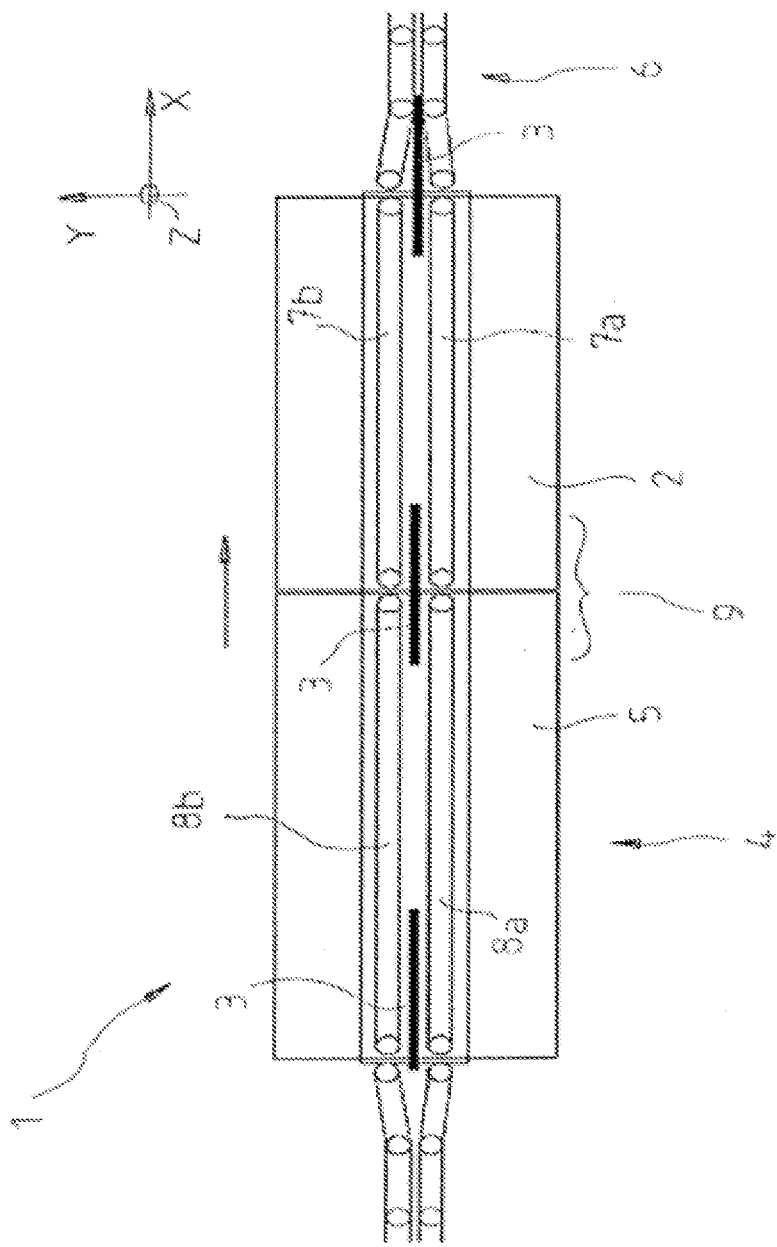
FIG. 1 shows a schematic plan view of a transport path running over a weighing cell.
Figure 2:
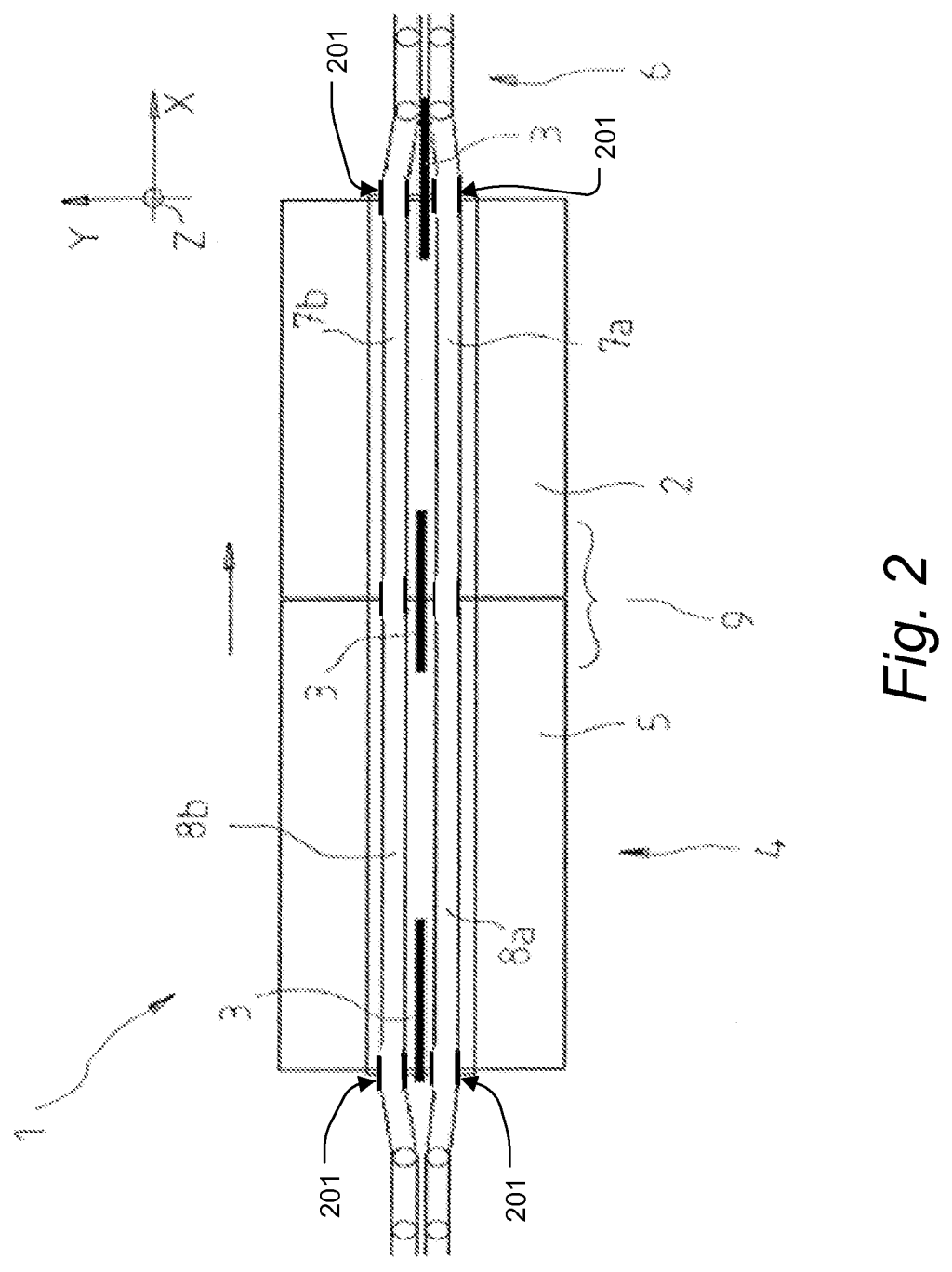
Figure 3:
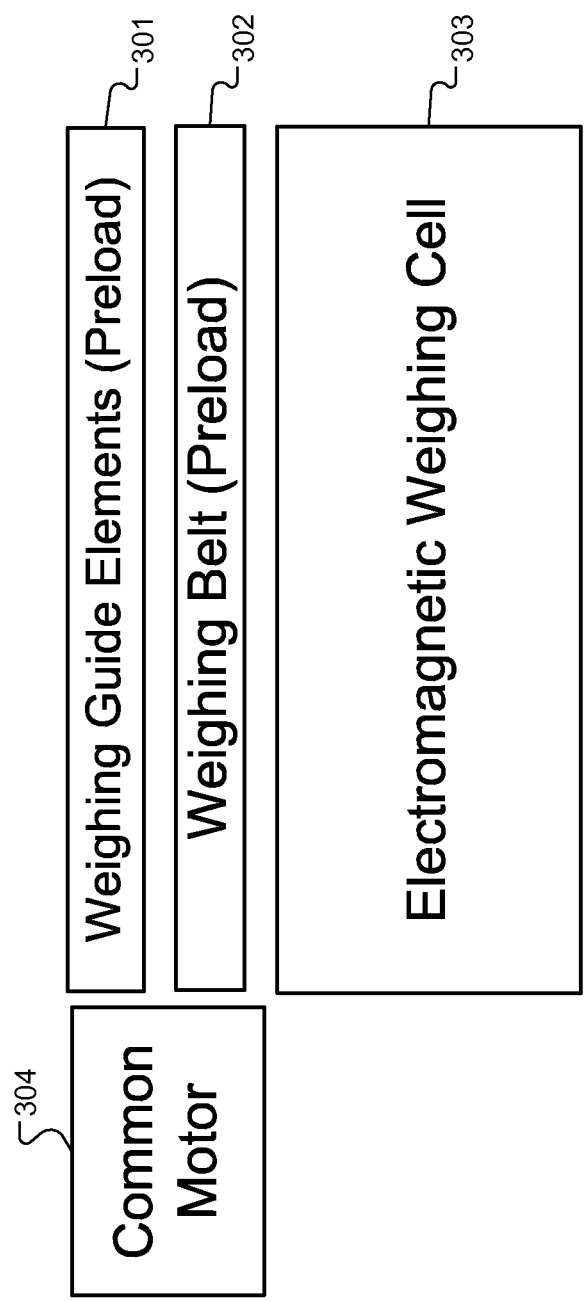
FIG. 3 shows a block diagram view of one embodiment of the present invention.

An embodiment of the invention will be described below with reference to the examples shown in FIGS. 1-3. In a schematic plan view, FIG. 1 shows a transport path running over a weighing cell, not shown. The transport device 1 comprises a weighing belt 2 that forms a preload for the weighing cell arranged underneath the drawing plane. Upstream of the weighing belt 2, an inlet area is provided that comprises a supply device 4. The letters 3 are transported on edge on a supply belt 5 and transferred to the weighing belt 2 in a transfer area 9, in which the letter 3 has contact with the supply device 4 and the supply belt 5.

Two weighing-guide elements 7a, 7b, which form a lateral rest for the letter 3 without clamping it, are provided on the sides of the letters 3 above the weighing belt 2. The distance between the two weighing guides 7a, 7b is selected to be greater than the maximum thickness or Y-extension of a letter 3.

Lateral inlet guide elements 8a, 8b that have the same distance between one another as the weighing-guide elements 7a, 7b are also provided in the supply device 4 in the inlet area upstream of the weighing belt 2. In addition, the guide elements 7a, 8a and 7b, 8b as well as the weighing belt 2 and the supply belt 5 are arranged flush, one after the other, in the direction of transport X. All guide elements 7a, 7b, 8a, and 8b are configured as belts, with the respective sections of the belt facing the letter 3 being driven in the transport direction X at the same speed X as the weighing belt 2 and the supply belt 5.

A letter 3 supplied to the inlet area is transported between the inlet guide elements 8a, 8b on edge standing on the supply belt 5 (corresponding in the drawing to the arrow from left to right). In a transfer area 9, the letter 3 comes into contact with the weighing belt 2 as well as the weighing-guide elements 7a or 7b, which together form the weighing belt preload for the weighing cell. Due to the consistent distances selected between the inlet guide elements 8a, 8b and the weighing-guide elements 7a, 7b, the weighing belt 2 receives the letter 3 without shock effects in the lateral, vertical or transport direction, so that the letter is transferred without additional forces acting on it and/or a change of its orientation in space. While the letter 3 is being transported by the weighing belt 2, its weight can be detected and further processed by the weighing cell. A removal area provided downstream of the weighing belt 2 can likewise be equipped with a transport belt or lateral guide elements in order to configure the transfer of the letter 3 from the weighing belt 2 into the removal area particularly interference-free.

As used herein, the terms "comprising," "including." "having," and the like are to be understood to be open-ended, that is, to mean including but not limited to.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A transport device for a dynamic scale, the transport device comprising:
   (a) a weighing belt that forms a preload for a weighing cell;
   (b) wherein the weighing belt is constructed to transport materials lying thereon and to be weighed along a first direction (X) with a simultaneous detection of their weight, the materials to be weighed extending in the first direction (X), a horizontal direction (Y) running perpendicular thereto, and a direction (Z) running perpendicular to the X and Y-directions;
   (c) wherein the weighing belt is adapted to receive the materials from a supply device arranged in an upstream inlet area, the supply device comprising a supply belt or supply rollers for supporting the materials and not forming a preload for the weighing cell; and
   (d) two weighing-guide elements, extending along the X-direction and forming a preload, provided for lateral support of the materials in the Y-direction in a manner adapted to allow weighing the materials during the transport on the weighing belt in a leaning position, wherein a minimum Y-distance between the weighing-guide elements is greater than the maximum extent of the materials in the Y-direction; and
   (e) wherein at least one of the weighing-guide elements is constructed as a belt element that can be driven at the same speed as the weighing belt.

2. The transport device of claim 1, wherein the supply device includes at least two inlet guide elements adapted to support the materials in the Y-direction in a manner secured against falling over, wherein the Y-distance between the inlet guide elements, at least in a transfer region from the supply device to the weighing belt, substantially matches the Y-distance between the weighing-guide elements in this area.

3. The transport device of claim 2, wherein the weighing-guide elements and the inlet guide elements adjoin one another or partially overlap in the X-direction in a manner adapted to avoid transfer shocks in the X-direction.

4. The transport device of claim 1, wherein the transport device is constructed for transporting upright materials, comprising letters standing upright on a long edge, whose dimensions in the Y-direction are small relative to those in the X and Z-directions.

5. The transport device of claim 1, wherein at least one of the inlet guide elements is constructed as a belt element and can be driven at the same speed as the at least one weighing-guide element.

6. The transport device of claim 5, wherein the weighing belt and the weighing-guide elements are adapted to be driven by a common motor.

7. The transport device of claim 5, wherein all components driven for guidance or transport purposes are driven at the same rotational speed.

8. The transport device of claim 1, wherein shafts of all components driven for guidance purposes, or all motors provided for guidance or transport purposes, are arranged in the measurement direction of the weighing cell in a manner adapted to reduce mechanical interference.

9. The transport device of claim 1, wherein the motors of all components driven for guidance or transport purposes are operable in a synchronized manner adapted to reduce interfering frequencies.

10. A dynamic scale including a transport device comprising:
    (a) a scale;
    (b) a weighing cell adapted to hold material to be weighed by the scale;
    (c) a weighing belt that forms a preload for the weighing cell;
    (d) wherein the weighing belt is constructed to transport materials lying thereon and to be weighed along a first direction (X) with a simultaneous detection of their weight, the materials to be weighed extending in the first direction (X), a horizontal direction (Y) running perpendicular thereto, and a direction (Z) running perpendicular to the X and Y-directions;
    (e) wherein the weighing belt is adapted to receive the materials from a supply device arranged in an upstream inlet area, the supply device comprising a supply belt or supply rollers for supporting the materials and not forming a preload for the weighing cell;
    (f) two weighing-guide elements, extending along the X-direction and forming a preload, provided for lateral support of the materials in the Y-direction in a manner adapted to allow weighing the materials during the transport on the weighing belt in a leaning position, wherein a minimum Y-distance between the weighing-guide elements is greater than the maximum extent of the materials in the Y-direction; and
    (g) wherein at least one of the weighing-guide elements is constructed as a belt element that can be driven at the same speed as the weighing belt.

11. The dynamic scale of claim 10, in which the scale operates according to the principle of electromagnetic force compensation.

12. The dynamic scale of claim 10, wherein the supply device includes at least two inlet guide elements adapted to support the materials in the Y-direction in a manner secured against falling over, wherein the Y-distance between the inlet guide elements, at least in a transfer region from the supply device to the weighing belt, substantially matches the Y-distance between the weighing-guide elements in this area.

13. The dynamic scale of claim 12, wherein the weighing-guide elements and the inlet guide elements adjoin one another or partially overlap in the X-direction in a manner adapted to avoid transfer shocks in the X-direction.

14. The dynamic scale of claim 10, wherein the dynamic scale is constructed for transporting upright materials, comprising letters standing upright on a long edge, whose dimensions in the Y-direction are small relative to those in the X and Z-directions.

15. The dynamic scale of claim 10, wherein at least one of the inlet guide elements is constructed as a belt element and can be driven at the same speed as the at least one weighing-guide element.

16. The dynamic scale of claim 15, wherein the weighing belt and the weighing-guide elements can be driven by a common motor.

17. The dynamic scale of claim 15, wherein all components driven for guidance or transport purposes are driven at the same rotational speed.

18. The dynamic scale of claim 10, wherein shafts of all components driven for guidance purposes, or all motors provided for guidance or transport purposes, are arranged in the measurement direction of the weighing cell in a manner adapted to reduce mechanical interference.

19. The dynamic scale of claim 10, wherein the motors of all components driven for guidance or transport purposes are operable in a synchronized manner adapted to reduce interfering frequencies.

* * * * *